United States Patent [19]

Cohn et al.

[11] Patent Number: 4,763,799

[45] Date of Patent: Aug. 16, 1988

[54] MODULAR UTILITY CART INCLUDING IMPROVED STRUCTURES FOR SECURING INTERMEDIATE AND TOP SHELVES TO CORNER POSTS

[75] Inventors: Robert J. Cohn, Dallas, Pa.; W. Stanley Rosania, Stockton; Jeffrey W. Rosania, Bloomsbury, both of N.J.; Michael J. Sudimak, Shavertown, Pa.

[73] Assignee: InterMetro Industries Corporation, Wilkes-Barre, Pa.

[21] Appl. No.: 97,835

[22] Filed: Sep. 17, 1987

[51] Int. Cl.⁴ ............................................. A47F 5/00
[52] U.S. Cl. .................................... 211/187; 211/208; 108/144
[58] Field of Search ............... 211/187, 208, 186, 181; 248/243; 108/106, 107, 144

[56] References Cited

U.S. PATENT DOCUMENTS

| | | | |
|---|---|---|---|
| 3,424,111 | 1/1969 | Maslow | 108/144 |
| 3,523,508 | 8/1970 | Maslow | 108/144 |
| 3,604,369 | 9/1971 | Maslow | 108/144 |
| 3,675,598 | 7/1972 | Kesilman et al. | 108/106 X |
| 3,757,705 | 9/1973 | Maslow | 108/144 |
| 4,318,352 | 3/1982 | Friedman et al. | 108/144 X |
| 4,593,826 | 6/1986 | Burtos | 211/187 |
| 4,595,107 | 6/1986 | Welsch | 108/144 X |
| 4,627,543 | 12/1986 | Nicely | 108/144 X |
| 4,637,323 | 1/1987 | Nicely | 108/144 X |

*Primary Examiner*—Robert W. Gibson, Jr.
*Attorney, Agent, or Firm*—Fitzpatrick, Cella, Harper & Scinto

[57] ABSTRACT

A modular utility cart includes four corner posts, at least one intermediate shelf and a top shelf. The cart incorporates improved structures for securing the intermediate and top shelves to the posts. Specifically, each intermediate shelf is formed with four open collars each for embracing one post. Each collar has a cross-section substantially congruent to the cross-section of the associated post, and has an upper right tubular portion embracing the post, a lower tubular portion having a downwardly outwardly inclined inner surface, and a transition portion between the upper and lower portions. The top shelf, which is mountable in the region of the tops of the posts, is formed with four blind tubular collars, each having a downwardly outwardly inclined inner surface and an inwardly projecting retaining flange at the bottom edge of the surface. Four sleeves are provided for each intermediate shelf and for the top shelf and each includes upper and lower edges, a right tubular inner surface for closely embracing a post, and a downwardly outwardly inclined outward surface matable with the inner surface of either the open collar or the blind collar.

17 Claims, 2 Drawing Sheets

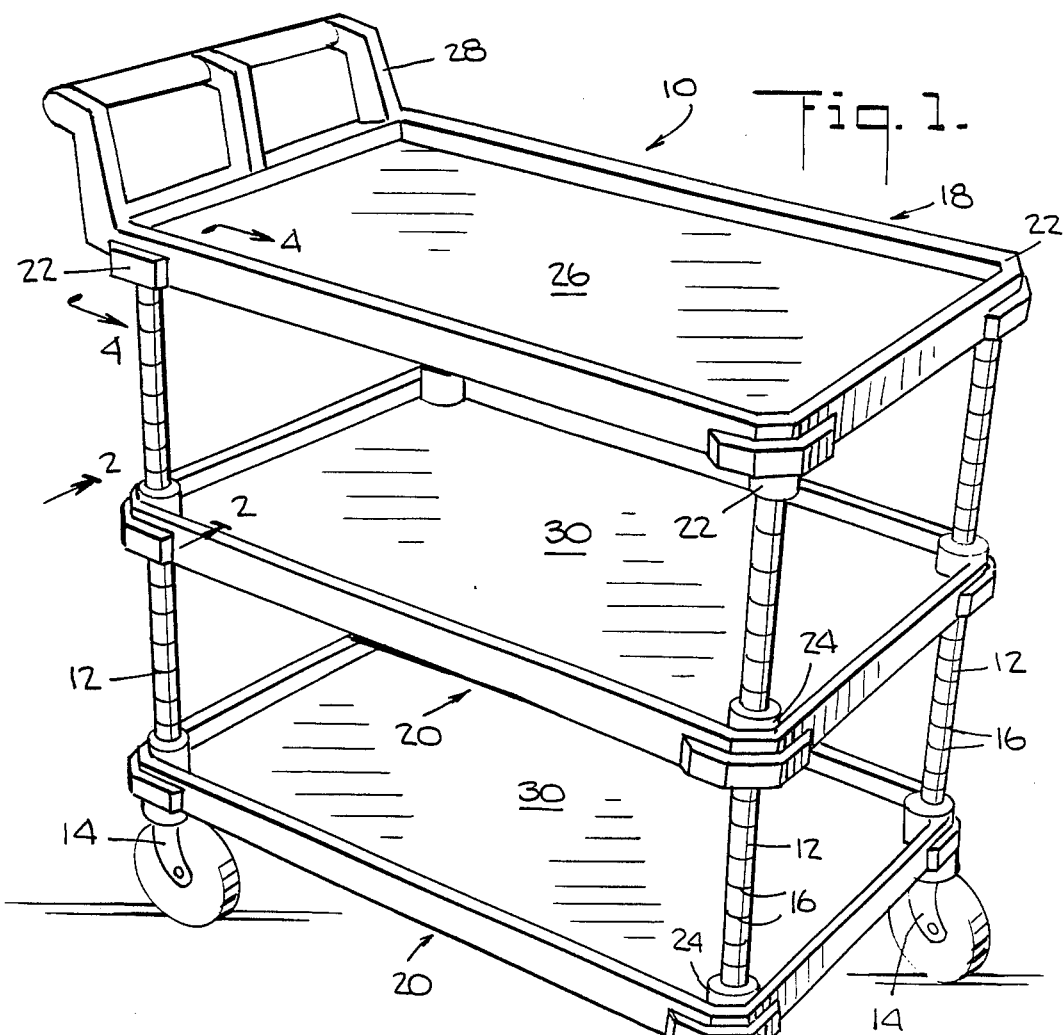
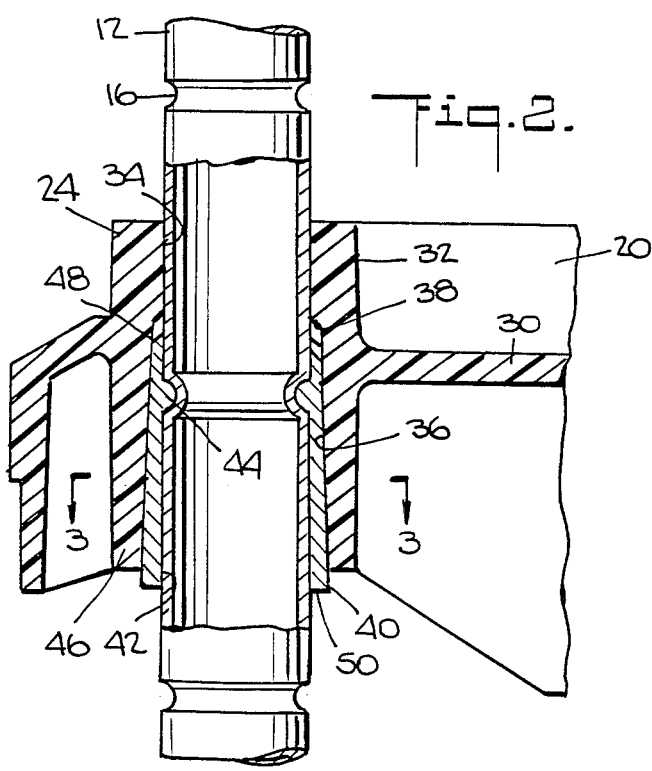
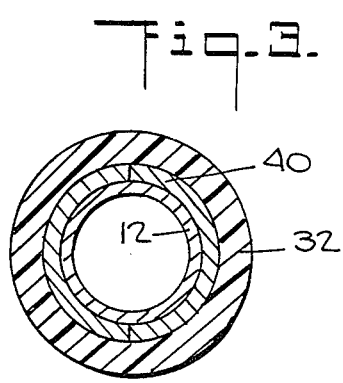

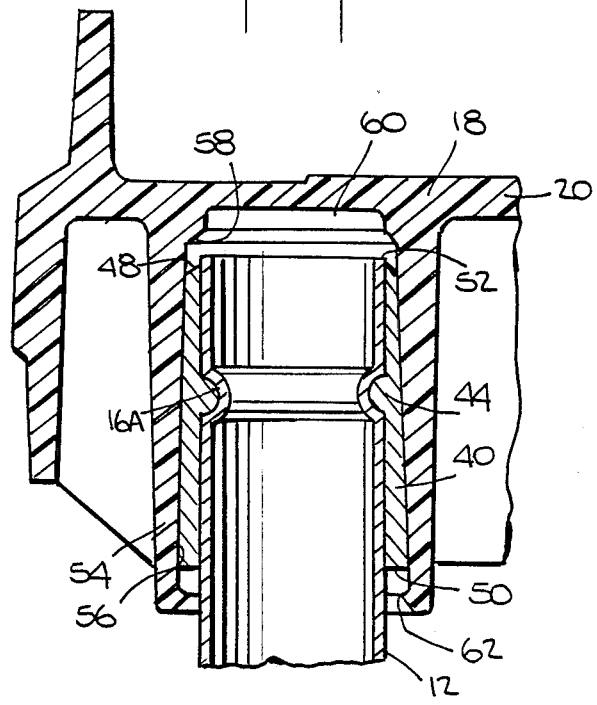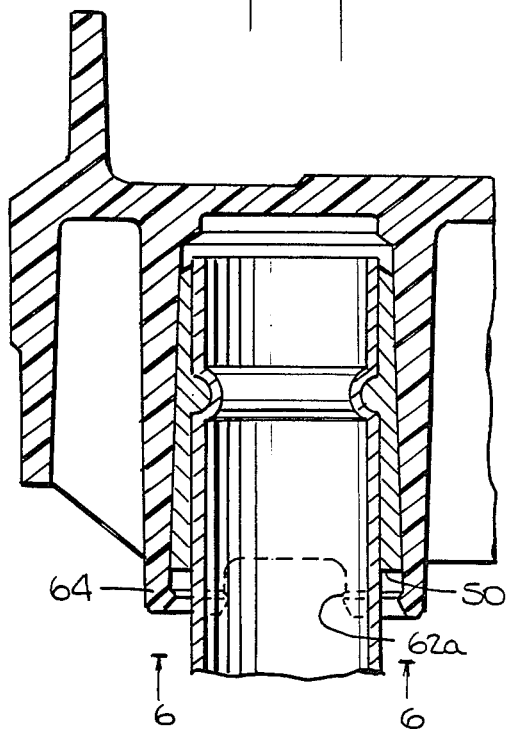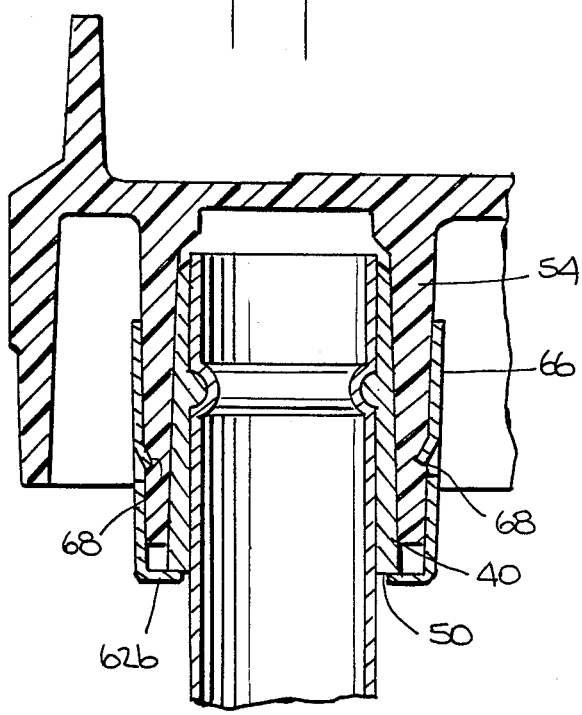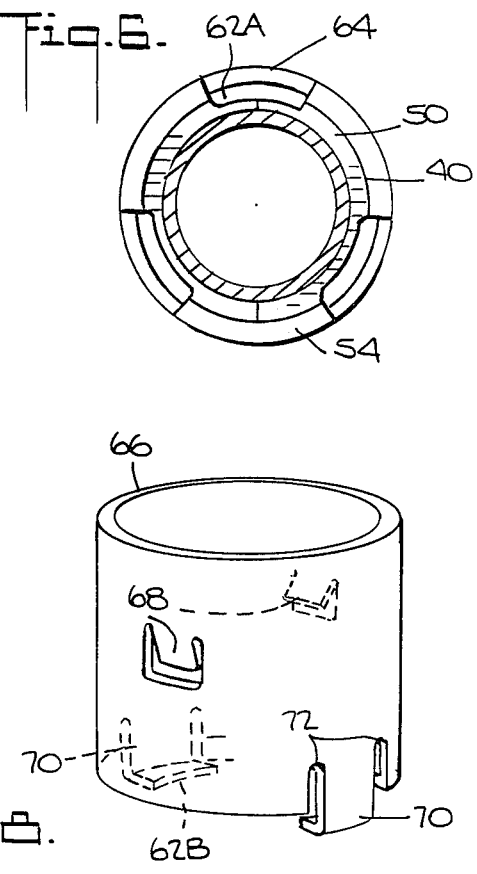

MODULAR UTILITY CART INCLUDING IMPROVED STRUCTURES FOR SECURING INTERMEDIATE AND TOP SHELVES TO CORNER POSTS

BACKGROUND OF THE INVENTION

1. Field of the Invention

The present invention relates generally to devices for transporting portable articles and may be used with particular advantage in hospitals, hotels, schools, and the like. More particularly, the present invention relates to a modular, knock-down utility cart that is easy to manufacture, to ship in knocked down condition from the point of manufacture to the point of use, and that can be easily assembled and later disassembled for compact storage. Still further, this modular utility cart incorporates improved structures for mounting intermediate shelves and a top shelf on corner supporting posts.

2. Description of the Prior Art

Utility carts of the type described above are ordinarily provided with four casters. They may include four corner posts, a handle at one or both ends of the cart, and two or more shelves such as a top and an intermediate shelf supported by the corner posts. Such carts have been manufactured as unitary welded or otherwise assembled structures or in knock-down modular form.

One problem with unitary utility carts employing, for example, welded construction, is that they are expensive to store and ship because of their size. Additionally, they may not be disassembled for compact storage when not in use.

The advent of knock-down utility carts constitutes a substantial improvement over carts having unitary construction. One such knock-down utility cart is described and illustrated in U.S. Pat. No. 4,595,107 (Welsch) assigned to the Assignee of the subject invention. This device generally incorporates four-corner posts, each of which is provided with a caster at its bottom and two or more shelves are mounted on the corner posts using the InterMetro Industries SUPER ERECTA modular shelving system. The device also incorporates an improved modular handle arrangement. U.S. Pat. Nos. 3,424,111 (Maslow) and 3,757,705 (Maslow), also assigned to the Assignee of the subject invention, describe the SUPER ERECTA system, which generally incorporates four right cylindrical corner posts each formed with a plurality of regularly spaced angular grooves along the axis of the post. Each shelf is provided with a frustoconical collar that receives a similar frustoconical sleeve which in turn embraces the post. Downward movement of the shelf causes the collar and sleeve to interengage thereby inwardly compressing the sleeve against the post. The sleeve shown in U.S. Pat. No. 3,757,705 includes an annular outwardly projecting flange at its bottom edge which is said to limit downward movement of a collar on the sleeve. However, this exposed flange has a tendency to collect contaminants and, therefore, may become unsanitary.

Further, in shelving system and particularly utility cart applications, it may be desirable to make shelves out of plastic material such as structural foam. However, because of the inherent nature of such material, they exhibit plastic deformation or tend to "creep". If plastic is used in shelving in the SUPER ERECTA system a frustoconical collar formed directly in the plastic shelf has a tendency to expand radially outwardly as it engages the outer frustoconical surface of a sleeve. Thus, the collar in the shelf may eventually override the sleeve in such a way as to cause the structural integrity of the system significantly to deteriorate.

Further, when mounting a top shelf on four corner posts using the SUPER ERECTA shelf system in utility cart applications, provision should be made to resist disassembly of the top shelf from the posts by upward movement that might result if an operator lifts the top shelf, for example, to move the cart over an obstacle.

SUMMARY OF THE INVENTION

It is an object of the present invention to provide a modular knock-down utility cart that has all of the advantages of prior art of similar kind. That is the cart of the present invention is intended to be easily manufactured, shipped, and stored as well as easily assembled for use and disassembled thereafter.

It is a further object of the present invention to provide a knock-down modular utility cart that utilizes improved structures for mounting both intermediate shelves and a top shelf on four supporting corner posts so that the shelves may be made economically from plastic material such as structural foam.

It is a further object of the present invention to provide these advantages in a utility cart which nevertheless exhibits structural rigidity in all directions.

The knock-down modular utility cart in accordance with a preferred embodiment of present invention comprises a plurality, preferably four, of corner support posts that may be adapted from the InterMetro Industries SUPER ERECTA shelf system. The cart further includes at least one intermediate shelf and a top shelf. The intermediate shelf is mountable on the posts and is formed with four open collars, each one encircling one post. Each collar has a cross-section substantially congruent to the cross-section of the post and is formed with an upper tubular portion closely embracing one post, a lower tubular portion having a downwardly, outwardly inclined inner surface, and a transition portion between upper and lower portions.

The top shelf is mountable in the region of the tops of the four corner posts and is formed with a plurality of blind tubular collars, each having a downwardly, outwardly inclined inner surface and an inwardly projecting retaining flange at the bottom edge of that surface. Each blind collar may also have an abutment surface, similar to the transition portion of each open collar.

A plurality of sleeves, one for each open collar of each intermediate shelf and one for each blind collar of the top shelf, each includes an upper and lower edge and a right tubular inner surface closely embracing a respective corner post. Each sleeve also has a downwardly, outwardly inclined outer surface matable with the lower portion of the inner surface of an open collar or the inner surface of a blind collar.

Downward movement of the intermediate shelf, and thus the open collars on the respective sleeves, causes the inclined inner surface of each collar and inclined outer surface of each sleeve to mate, thus compressing the sleeve inwardly toward the associated corner post. Such downward movement is limited, however, by abutment of the top edge of one sleeve with the transition portion of the open collar.

Downward movement of the top shelf and thus the blind collars on associated sleeves and posts causes each retaining flange initially to override the outer surface of the associated sleeve and to permit the outer surface of the sleeve to mate with the inner surface of the blind collar. Additional downward movement causes the blind collar to inwardly compress the sleeve toward the post and causes the returning flange to underlie the bottom edge of the associated sleeve. Subsequent upward movement of the blind collar is resisted by engagement of the retaining flange with the bottom edge of the associated sleeve.

The provision of the transition portion on the interior of each open collar and its abutment against the top edge of the sleeve eliminates the peripheral flange shown in U.S. Pat. No. 3,757,705 on which contaminants may collect. That is, the abutting surfaces of the transition portion in the top of the sleeve are essentially completely sealed from the outer environment but nevertheless perform a downward movement limiting function important when the shelves are made of a plastic material.

Further, the provision of the blind collar-sleeve structure constitutes a simple and elegant system for restricting undesirable upward movement of the top shelf and consequent unintended disassembly of the utility cart. Thus, the top shelf, as well as the intermediate shelf, may be made of plastic materials with inexpensive molding techniques.

The foregoing and other objects and advantages of the present invention may be more clearly understood from consideration of the following detailed description of the preferred embodiments taken in conjunction with the accompanying drawing.

BRIEF DESCRIPTION OF THE DRAWING

FIG. 1 is a perspective view of a modular knockdown utility cart constructed and assembled in accordance with a preferred embodiment of the present invention.

FIG. 2 is a vertical cross-sectional view taken on plane 2—2 in FIG. 1 and illustrating the improved structure for mounting an intermediate shelf on a corner post.

FIG. 3 is a horizontal cross-sectional view taken on plane 3—3 in FIG. 2.

FIG. 4 is a vertical cross-sectional view taken on plane 4—4 in FIG. 1 and illustrating an improved structure for mounting the top shelf on the corner posts.

FIG. 5 is a vertical cross-sectional view similar to FIG. 4 showing another embodiment of an improved structure for securing the top shelf to four corner posts.

FIG. 6 is a horizontal cross-setnial view taken on plane 6—6 of FIG. 5.

FIG. 7 is a vertical cross-sectional view similar to FIG. 4 and illustrating another alternative embodiment of an improved structure for securing the top shelf to four corner posts.

FIG. 8 is a perspective view of a metal boss used in the embodiment of FIG. 7 to provide a retaining flange.

DETAILED DESCRIPTION OF THE PREFERRED EMBODIMENTS

As shown in FIG. 1, the knock-down modular utility cart, generally indicated at 10, in accordance with a preferred embodiment of the present invention, includes four corner posts or columns 12, each having a caster 14 mounted at its bottom end.

The cart further includes a top shelf generally indicated at 18 and one or more (in the illustrated embodiment two) intermediate shelves 20. The top shelf is secured at each of its four corners 22 to one of the posts 12 in the region of the top of the post. Similarly, each intermediate shelf is secured in the region of each of its corners 24 to one of the corner posts 12. The structures for attaching the shelves to the respective corner posts, which will be described in greater detail below, constitute a significant improvement over the prior art.

The top shelf 18 may include a deck 26 for carrying articles (not shown) and may be formed with a handle 28 at one end as shown in FIG. 1, or at both ends if desired. Similarly, the intermediate shelves 20 are each formed with a deck 30 also for carrying articles (not shown).

Referring now to FIGS. 2 and 3, the structures for securing each intermediate shelf 20 to the corner posts 12 will now be described in detail. As shown there, each post is a right cylinder and is formed with a plurality of annular grooves 16 at regular intervals, for example, one inch, along its length.

Each intermediate shelf 20 is formed at each corner 24 with an open collar 32, that is, open at both ends, extending vertically therethrough. The collar includes an upper section 34 formed as a right cylinder that closely embraces the outer surface of one post 12. The collar further includes a frustoconical lower section 36 having an inner surface downwardly and outwardly inclined at a moderate angle with respect to the axis of the collar. A transition section 38, also having frustoconical form, is inclined downwardly and outwardly at an angle of approximately 45 degrees between the upper and lower sections 34 and 36.

Interposed between the lower section 36 of the collar 32 and the post 12 is a frustoconical sleeve 40 having a right cylindrical inner surface 42 that closely embraces the outer surface of the post 12. Further, the sleeve is formed as two axially split halves as can be seen in FIG. 3 and on its inner surface 42 has an annular rib 44 that may interfit with any one of the annular grooves 16 provided on the post.

The sleeve also has a frustoconical outer surface 46 inclined downwardly and outwardly at the same angle as is the lower section 36 of the collar 32. In the respects thus far described, the post 12 and sleeve 40 are conventional as is shown in U.S. Pat. No. 3,757,705 (Maslow), the disclosure of which is incorporated herein by reference. However, the sleeve differs from that shown in the '705 Maslow patent in that it has an upper edge 48 of frustoconical form inclined downwardly and outwardly at an angle of 45 degrees. Moreover, the sleeve has a lower edge 50 that directly joins the outer frustoconical surface 46 in a fashion such as is illustrated in U.S. Pat. No. 3,424,111 (Maslow), the disclosure of which is also incorporated herein by reference. That is, the sleeve does not incorporate a lower outwardly directed flange that might otherwise arrest downward movement of the collar thereon relative to the sleeve, but which also would have a tendency to collect contaminants.

It will be appreciated that each intermediate shelf 20 may be loaded vertically to urge it downwardly such that the frustoconical inner surface of the lower section 36 of the collar 32 mates tightly with the frustoconical outer surface 46 of the sleeve 40. This interaction urges the sleeve radially inwardly toward the post to tightly engage the annular rib 44 in an annular groove 16 thus preventing further downward movement of the sleeve.

However, each intermediate shelf 20 is desirably made of a plastic material such as structural foam and therefore may be subject to plastic deformation or creep. Over time, if heavily loaded, therefore, the lower portion 36 of the collar 32 may radially enlarge or expand permitting the shelf and collar to move further downwardly relative to the sleeve 40. However, such downward movement is ultimately arrested by abutment of the top edge 48 of the sleeve with the transition section 38 of the collar. Significant plastic deformation to outwardly expand the lower section of the collar then also stops.

It will be appreciated that by eliminating a lower outwardly directed flange at the bottom edge of the sleeve, a structure ordinarily which would collect contaminants, undesirable in sanitary applications, is eliminated. Instead, the abutting surfaces between the sleeve and collar are essentially sealed from the outer environment and therefore do not readily collect such contaminants. Thus, the system for mounting the intermediate shelves on the corner posts constitutes a substantial improvement over the prior art both in its particular design for fabrication from low cost plastic materials and by eliminating an otherwise unsanitary construction.

Reference will now be made to FIG. 4 for a description of the improved device for securing the top shelf 18 in the regions of the tops of the corner posts 12. As shown there, the post 12 includes a final annular groove 16A near its top 52. A sleeve 40 of form identical to that described with reference to FIGS. 2 an 3, is mounted in the region of the top 52 of the post 12 with its annular rib 44 received in the uppermost groove 16A.

The top shelf is formed with a blind collar 54 having a frustoconical inner surface 56. At its upper edge, the inner surface 56 terminates in a short frustoconical abutment section 58 inclined downwardly and outwardly at an angle of about 45 degrees and adjacent that short section is a dome 60 having cylindrical sides and a flat roof.

The blind collar 54 is formed at its lower extreme with an annular inwardly directed retaining flange 60 that, in the assembled condition shown in FIG. 4, underlies the bottom edge 50 of the sleeve 40.

Thus, it will be understood that, as was the case with mounting of the intermediate shelf with the corner posts through the sleeves, downward movement of the top shelf will be limited by abutment of the short frustoconical section 58 with the upper edge 48 of the sleeve. At such extreme of downward movement, any upwardly projecting portion of the post 12 extending above the sleeve 40 may be received in the dome 60. Furthermore, upward movement of the top shelf 18 and thus the blind collar 54 relative to the sleeve 40 and post 12 will be resisted by interengagement of the retaining flange 62 with the bottom edge 50 of the sleeve. Therefore, the utility cart of the present invention may be manipulated easily even by lifting the top shelf, using the handle 28, to move the cart from place to place.

The top shelf is assembled on to the posts and sleeves by inserting one post and sleeve into each blind collar 54. Downward movement of the top shelf causes the retaining flange 62 to override the frustoconical outer surface 56 of the sleeve 40 until it underlies the lower edge 50. At this time, the frustoconical inner surface 56 of the blind collar and frustoconical outer surface 46 of the sleeve will tightly mate together urging the sleeve radially inwardly to firmly secure the rib in the uppermost groove 16A in a fashion similar to that described with reference to interaction of the open collar 32 of the intermediate shelf 20 and the sleeve 40.

As shown in FIG. 4, the annular retaining flange extends about the full circumference of the lower extreme of the blind collar 54. However, an alternative is illustrated in FIGS. 5 and 6 in which the retaining flange is formed as three arcuate sections 62A one on each of three depending fingers 64. These flange sections 62 A underlie the lower edge 50 of the sleeve in the same fashion as does the flange 62 described with reference to FIG. 4.

Still a further embodiment of the retaining flange arrangement is shown in FIGS. 7 and 8. In this embodiment, a cylindrical metal boss 66 is secured in tight encircling relation about the blind collar 54 by means of inwardly bent tangs 68 that grip the collar. The cylindrical boss is formed at its lower edge with an inwardly directed annular flange sections 62B to underlie the lower edge 50 of the sleeve 40 in the same fashion described with reference to FIGS. 4 through 6. As can be seen in FIG. 8, each radially inwardly directed flange section 62B may be formed on a depending finger cut from the side walls of the boss 66 by means of vertically extending slots 72 to enhance flexing of them when the boss is mounted by being urged downwardly over the sleeve. The cylindrical boss further serves to restrain radial outward plastic deformation of the blind collar 54 when the top shelf is vertically loaded due to interaction of the mating frustoconical surfaces of the collar and sleeve.

In each of the embodiments shown in FIGS. 4 through 8, while the flange 62 resists disengagement of the top shelf 18 from the four corner posts 12 and sleeves 40, the top shelf may nevertheless be disassembled from the posts and sleeves if desired by exerting a sharp, relatively large upward force thereon.

Therefore, the utility cart of the present invention provides notable advantages over similar knock-down, modular utility carts known in the art. The cart of the invention incorporates improved structures for mounting both top and intermediate shelves on corner posts that provide improved sanitation as well as improved assembly. The cart may be easily manipulated without accidental disassembly. However, the cart can nevertheless be disassembled when desired.

Although specific embodiments of the present invention have been described above in detail, it is to be understood that this is for purposes of illustration. Modification may be made to the preferred embodiments of the knock-down modular utility cart described above without departing from the scope of the present invention.

What is claimed is:

1. A device for securing an element to a column, comprising:

means cooperating with said element and defining a collar for embracing said column, said collar having a cross-section substantially congruent to the cross-section of said column, an upper right tubular portion closely embracing said column, a lower tubular portion having downwardly outwardly inclined inner side surfaces, and a transition portion between said upper portion and said lower portion; and a sleeve having an upper edge, a right tubular inner surface closely embracing said column and a downwardly outwardly inclined outer surface formed to mate with said lower tubular portion of said collar, whereby downward movement of said collar about said sleeve on said column causes said respective inclined surfaces of said lower portion and said sleeve to mate and inwardly compress said sleeve toward said column, such downward movement being limited by abutment of said top edge of said sleeve with said transition portion of said collar.

2. A device according to claim 1, wherein said column is a right cylinder, said cross-section of said collar is circular and said inner surface and said outer surface of said sleeve have circular cross-sections.

3. A device according to claim 1, further comprising means for locating said sleeve at discrete locations along the axis of said column.

4. A device according to claim 1, wherein said transition portion of said collar is downwardly outwardly inclined at an angle to the axis of said collar substantially greater than that of downward outward inclination of said lower portion.

5. A device according to claim 4, wherein said top edge of said sleeve is downwardly outwardly inclined at an angle to the axis of said sleeve substantially the same as that of downward outward inclination of transition portion.

6. A device according to claim 1, where said collar is made of plastic material.

7. A device for securing an element to a column, comprising:

a sleeve having upper and lower edges, a right tubular inner surface for closely embracing said column, and a downwardly, outwardly inclined outer surface; and means cooperating with said element and defining a blind tubular collar having a downwardly outwardly inclined inner surface formed to mate with said outer surface of said sleeve, and an inwardly projecting retaining flange formed to underlie said lower edge of said sleeve when said outer surface of said sleeve and said inner surface of said collar are in mating relation, whereby downward movement of said collar about said sleeve on said column causes said retaining flange initially to override said outer surface of said sleeve to permit said outer surface of said sleeve to mate with the inner surface of said collar, whereby further such downward movement causes said collar to inwardly compress said sleeve toward said column and causes said retaining flange to underlie said lower edge of said sleeve, and whereby subsequent upward movement of said collar is resisted by engagement of said retaining flange on the lower edge of said sleeve.

8. A device according to claim 7, wherein said column is a right cylinder, said sleeve has a right cylindrical inner surface and the cross-section of said outer surface of said collar is circular.

9. A device according to claim 7, further comprising means for locating said sleeve at a fixed axial position on said column when said inner surface of said collar mates with the outer surface of said sleeve.

10. A modular utility cart comprising:
a plurality of support posts;
at least one intermediate shelf mountable on said posts, said intermediate shelf including means defining a plurality of open collars each for embracing one said post, each said collar having a cross-section substantially congruent to the cross-section of one said post, an upper right tubular portion closely embracing said post, a lower tubular portion having a downwardly outwardly inclined inner surface, and a transition portion between said upper portion and said lower portion;

a top shelf mountable in the region of the tops of said posts, said top shelf including means defining a plurality of blind tubular collars each having a downwardly outwardly inclined inner surface and an inwardly projecting retaining flange in the region of the bottom of said inner surface; and a plurality of sleeves, one for each open collar of said intermediate shelf and for each blind collar of said top shelf, each said sleeve including upper and lower edges, a right tubular inner surface closely embracing one said post and a downwardly outwardly inclined outer surface matable with said lower portion of said inner surface of said open collar and said inner surface of said blind collar;

whereby downward movement of one said open collar about one said sleeve on an associated post causes said respective inclined inner surface of said open collar and said inclined outer surface of said sleeve to mate and inwardly compress said sleeve toward said associated post, said downward movement being limited by abutment of said top edge of said one sleeve with said transition portion of said one open collar; and whereby downward movement of one said blind collar about another said sleeve positioned in the region of the top of an associated post causes said retaining flange initially to override said outer surface of said other sleeve to permit said outer surface of said other sleeve to mate with said inner surface of said one blind collar whereby further such downward movement compresses said other sleeve toward said post and causes said retaining flange to underlie said lower edge of said sleeve, and whereby subsequent upward movement of said blind collar is resisted by engagement of said retaining flange on the lower edge of said other sleeve.

11. A modular utility cart according to claim 10, wherein each said post is a right cylinder, said cross-section of each said open collar is circular, and said inner surface and said outer surface of said sleeve have circular cross-sections.

12. A modular utility cart according to claim 10, further comprising means for locating each said sleeve at discrete locations along the axis of an associated post.

13. A modular utility cart according to claim 10, wherein said transition portion of each said open collar is downwardly outwardly inclined at an angle to the axis of said collar substantially greater than that of downward outward inclination of said lower portion.

14. A modular utility cart according to claim 13, wherein said top edge of each said sleeve is downwardly outwardly inclined at an angle to the axis of said sleeve substantially the same as downward outward inclination of said transition portion of each said open collar.

15. A modular utility cart according to claim 10, wherein each said post is a right cylinder, each said sleeve has a right cylindrical inner surface and an sur-face having a circular cross-section.

16. A modular utility cart according to claim 10, further comprising means for locating one said sleeve at a fixed position in the region of the top of each said post when said inner surface of one said blind collar mates with the outer surface of such sleeve.

17. A modular utility cart according to claim 10, each further comprising a metal boss embracing the outer outer surface of each said blind collar, said retaining flange being provided on a bottom edge of said boss.

* * * * *

UNITED STATES PATENT AND TRADEMARK OFFICE
CERTIFICATE OF CORRECTION

PATENT NO. : 4,763,799

DATED : August 16, 1988

INVENTOR(S) : ROBERT J. COHN, ET AL.

It is certified that error appears in the above-identified patent and that said Letters Patent is hereby corrected as shown below:

COLUMN 1

Line 38, "four-corner" should read --four corner--.

COLUMN 3

Line 49, "cross-sectinal" should read --cross-sectional--.

COLUMN 5

Line 38, "retaining flange 60" should read --retaining flange 62--.
    Line 61, "surface 56" should read --surface 46--.

COLUMN 7

Line 20, "of transition" should read --of said transition--

UNITED STATES PATENT AND TRADEMARK OFFICE
CERTIFICATE OF CORRECTION

PATENT NO. : 4,763,799
DATED : August 16, 1988
INVENTOR(S) : ROBERT J. COHN, ET AL.

It is certified that error appears in the above-identified patent and that said Letters Patent is hereby corrected as shown below:

COLUMN 8

Line 57, "an" should read --a--.
Line 64, "each" should be deleted.
Line 65, "outer" should be deleted.

Signed and Sealed this

Eighteenth Day of April, 1989

Attest:

DONALD J. QUIGG

Attesting Officer

Commissioner of Patents and Trademarks